United States Patent [19]
Beatty et al.

[11] Patent Number: 5,233,502
[45] Date of Patent: Aug. 3, 1993

[54] REMOVABLE AND REVERSIBLE DISPLAY DEVICE FOR PORTABLE COMPUTER

[75] Inventors: Brent A. Beatty; Gerard D. Wisgo, both of Boca Raton, Fla.

[73] Assignee: International Business Machines Corp., Armonk, N.Y.

[21] Appl. No.: 849,257

[22] Filed: Mar. 11, 1992

[51] Int. Cl.$^5$ .......................... H05K 7/10; G06F 1/16
[52] U.S. Cl. ..................... 361/729; 361/681; 248/558; 248/917; 439/218; 364/709.1; 359/62; 359/88; 340/700; 340/712
[58] Field of Search ............... 248/558, 917, 918, 919, 248/920, 921, 922, 923; 40/490, 575; 439/59, 62, 217, 218; 361/380, 392, 393, 394, 395, 390, 391, 399; 364/709.1; 359/62, 83, 88; 340/700, 712

[56] References Cited

U.S. PATENT DOCUMENTS

| | | | |
|---|---|---|---|
| 4,089,045 | 5/1978 | Mars | 248/634 X |
| 4,330,776 | 5/1982 | Dennison et al. | 248/918 X |
| 4,415,983 | 11/1983 | Lachmann et al. | |
| 4,730,186 | 3/1988 | Koga et al. | |
| 4,884,068 | 11/1989 | Matheny et al. | |
| 4,885,482 | 12/1989 | Sharp et al. | 439/62 X |
| 4,899,137 | 2/1990 | Behrens et al. | |
| 4,916,441 | 4/1990 | Gombrich | |
| 4,926,010 | 5/1990 | Citron | |
| 5,018,076 | 5/1991 | Johary et al. | |
| 5,048,210 | 9/1991 | Taylor et al. | 40/575 |
| 5,103,376 | 4/1992 | Blonder | 361/393 |
| 5,115,374 | 5/1992 | Hongoh | 361/393 |

FOREIGN PATENT DOCUMENTS

| | | | |
|---|---|---|---|
| 235320 | 9/1987 | European Pat. Off. | 439/76 |
| 356757 | 3/1990 | European Pat. Off. | 439/217 |
| 3808364 | 9/1989 | Fed. Rep. of Germany | 439/59 |

OTHER PUBLICATIONS

IBM Technical Disclosure Bulletin, vol. 30 No. 4, Sep. 1987, pp. 1674–1676 "Device Driver For a Touchpad or Touch Screen Computer Input Device".

Primary Examiner—Leo P. Picard
Assistant Examiner—Michael W. Phillips
Attorney, Agent, or Firm—Romualdas Strimaitis

[57] ABSTRACT

The invention relates to a portable, note-book, hand held or clam shell type of computer operable in multiple configurations. A modular, removable, and reversible display device with a touch screen feature is provided. With the display device disposed in a first configuration, the computer is operable in a first or open housing configuration. With the display device disposed in a second configuration, the computer is operable in a second or closed housing configuration.

7 Claims, 3 Drawing Sheets

REMOVABLE AND REVERSIBLE DISPLAY DEVICE FOR PORTABLE COMPUTER

FIELD OF THE INVENTION

This invention relates to portable, note-book, hand held or clam shell type computers.

BACKGROUND OF THE INVENTION

Among the primary considerations of computers of the type herein described include making a portable computer light enough and small enough in overall size to be adequately and comfortably portable. Another consideration of computers of the type herein described, as well as any general or specific purpose system, is the versatility of system hardware and application software to address a variety of functional needs.

Examples of the range of application needs include, but are certainly not limited to, such functions as inventory management or tracking, patient care, or general data entry. As the scope and nature of various application needs grow or expand, so to does the nature and type of application software and hardware designed to address those needs.

Inasmuch as primary considerations include hardware portability as well as application versatility, the two frequently pose a difficult, if not inconsistent, criteria to satisfy. Namely, meeting the demand of hardware resource imposed by application breadth or versatility, may be at the expense of size and portability.

In addition to size and weight, primary considerations further include making the portable computer components accessible and serviceable by non-technical users. In making a system more Serviceable, it may become necessary to expose a user to the internal electronic circuits of the system. Accordingly, it has become necessary to provide each user with elaborate instructions together with tools to allow assembly and disassembly of different components within the system.

Some of the above cited application needs may be most efficiently or expeditiously met by way of a touch or force sensitive hand held or portable input medium. That is, a display with an integral or overlaying touch screen, the combination functioning as a single device while serving dual purposes. Other application needs are more traditional in nature and may be best met by traditional input and display means, such as a keyboard and display screen. There are advantages to either type of configuration. However intuitively, if not inherently, these types of input and display methods appear to be mutually inconsistent as heretofore the two configurations have not been combined, thus leaving one with a choice in selection as to implementation and/or use.

OBJECTS OF THE INVENTION

In view of the foregoing, it is therefore an object of the invention to provide a flat panel display for use in a portable or hand held computer which may also serve selectively as an input device.

Another object of the invention is to provide a flat panel display for use in a portable or hand held personal computer which is operable in at least two different configurations of a computer housing.

Still another object of the invention is to provide a flat panel display or hand held computer which is operable in at least two configurations of a computer housing and serves as an input device in at least one of the computer housing configurations.

Yet another object of the invention is to provide a portable computer capable of multiple functions and utilizing multiple data input means.

SUMMARY OF THE INVENTION

The present invention is a portable personal computer which is relatively inexpensive to manufacture and which is capable of providing multiple functions or uses.

A housing comprising a base member and a cover member is provided with a display panel slidably mounted within a recess in the cover member and in either a first or open housing configuration or a second or closed housing configuration. The cover member also has a front and rear opening. The display panel can be plugged into the cover member so that the display panel is viewable only through the front or the rear opening. A keyboard is included in the base member and a disk drive may optionally be provided in either the base or cover member.

The display panel may be a plasma display device, a liquid crystal display of other flat display device. The display device includes a touch screen feature or function in addition to the standard display function. Further, the display panel has a connector which couples to one of two sockets in the cover member to activate the panel while in either the first or second or closed housing configuration, depending on which display panel connector is coupled to the cover member socket.

DETAILED DESCRIPTION OF THE INVENTION

Figure 1:
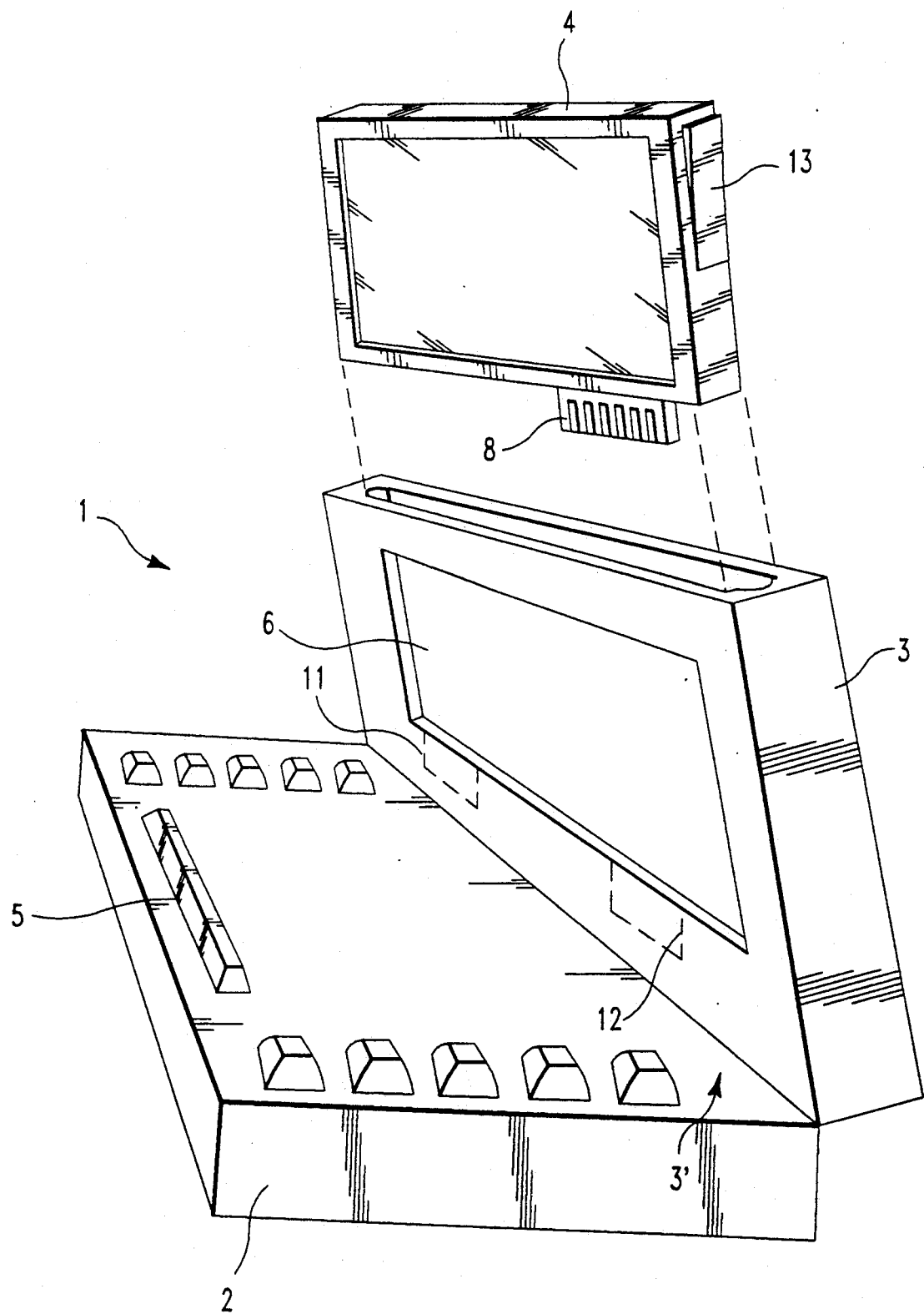
FIG. 1 illustrates a portable personal computer housing showing the system in an open configuration.

Referring to FIG. 1, a portable personal computer (1) includes a base member (2), a cover member (3), a display device (4) and keyboard (5) mounted on the base member (2). The base member (2) and cover member (3) in combination provide a housing that may be made of metal, plastic or similar material, or a combination of such materials. A disk drive (not shown) may be optionally provided in either the base member (2) or the cover member (3).

Figure 2:
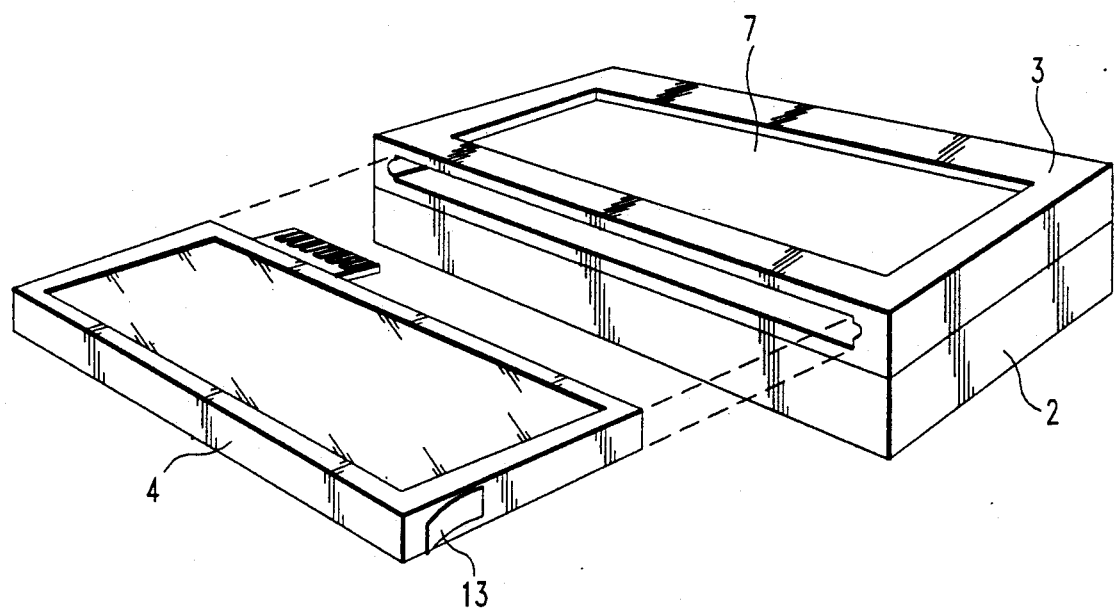
FIG. 2 illustrates a portable personal computer housing showing the system in a closed configuration.

The personal computer (1) folds open to a first or open housing configuration as illustrated in FIG. 1. The cover member (3) is connected by a hinge or the like to the base member (2) along a hinge line indicated generally at (3'). The personal computer (1) also folds closed to a second or closed housing configuration as illustrated in FIG. 2. Further, the cover member (3) and base member (2) pivotally cooperate about the hinge line (3') to facilitate configuring the personal computer (1) in, and/or between, the first or open housing configuration and second or closed housing configuration.

Figure 3:
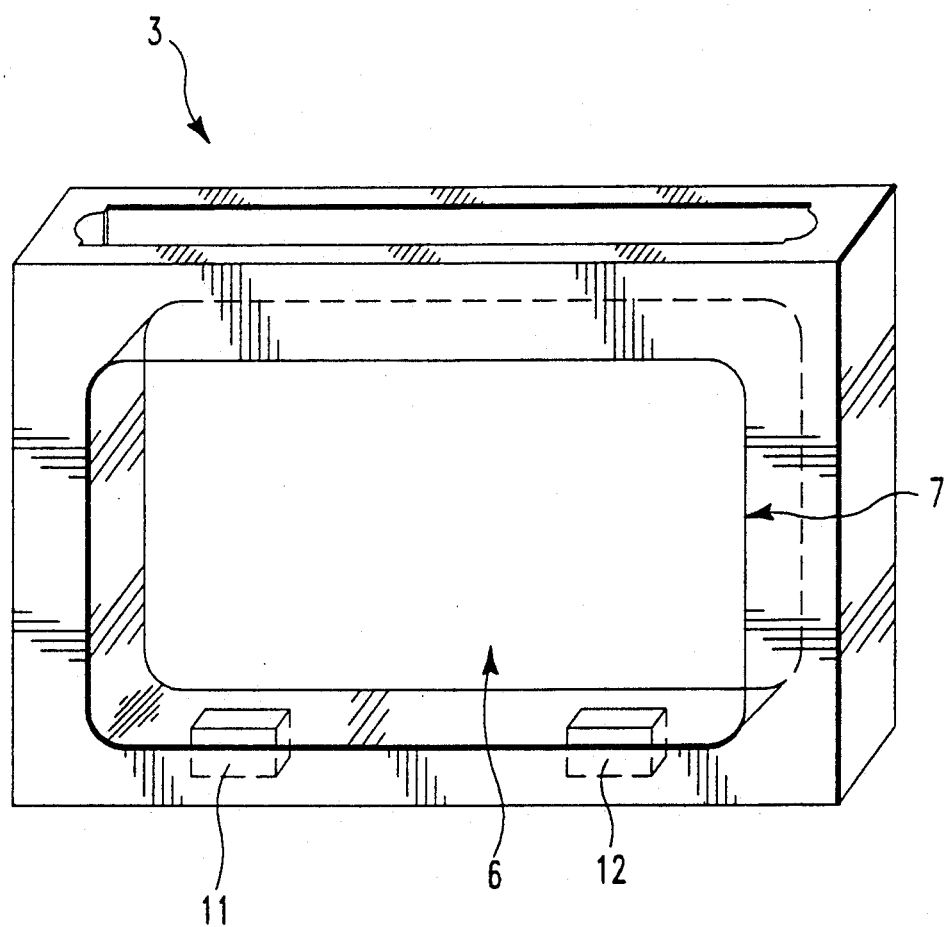
FIG. 3 further illustrates the cover member of the personal computer housing.

The cover member (3) has a window (6) disposed on its front side as illustrated in FIG. 1. The cover member (3) also has a window (7) disposed on its back side as illustrated in FIG. 2. FIG. 3 further illustrates the windows (6) and (7), on each side of the cover member (3).

The personal computer includes a display device (4) having an integral touch screen of the type illustrated, for example, in U.S. Pat. No. 4,545,023 and an integral connector (8) as shown in FIG. 1. The integral connector (8) is disposed anywhere, except on the symmetrical vertical axis, along the bottom of the display device. The display device (4) is reversibly mounted in the cover member (3). while in a first or open housing configuration, the integral connector (8) couples to a first socket (12) in cover member (3). Further, while in this first or open housing configuration, the touch screen function may be unavailable. That is, the keyboard (5) may provide the sole means of data entry and the display device (4) may provide a means of information display that is visible through the window (6) in the front of the cover member (3). Alternatively, the keyboard (5), display device (4) with its integral touch screen may be actuated to provide a second input device. The specific system configuration, as is readily apparent to one skilled in the art, is modifiable by way of either the basic input/output system (BIOS), operating system, application software or the like to configure the display device (4) to serve solely as a display or to serve as both a display and as a touch screen input device.

With the display (4) mounted in the reverse configuration as shown in FIG. 2, the integral connector (8) couples to a second socket (11) in the cover member (3) (not shown in FIG. 2), and the personal computer closed or folded for use in a second or closed housing configuration. In this second or closed housing configuration, the display/touch screen combination (4) is visible and accessible from the closed personal computer (1). While in this second or closed housing configuration, the display device (4) is viewable through the window (7) in back of the cover member (3) and provides the entire user interface. That is, the display device (4) with its integral touch screen provides a means of information display and a means of data entry.

As indicated in FIG. 1, the location of the integral connector (8) may be anywhere along the bottom of the display device (4), except on the symmetrical vertical axis of the display device (4). Further, the sockets (12) and (11) are disposed within the cover member (3), also off the symmetrical vertical axis, so that each will couple the connector (8) while the display device (4) is in either its first or open housing configuration or its second or closed housing configuration, respectively. The cover member (3) may also have cooperating grooves to align the display device (4) and its integral connector (8) with the cover member (3) and sockets (11) and (12). The configuration of the integral connector (8) may be of a standard or non-standard type. A standard 18 pin configuration is, for example:

| Pin No. | Function |
|---|---|
| P1 | Ground |
| P2 | 5v |
| P3 | 12V |
| P4-P11 | D0-D7 |
| P12 | Inhibit |
| P14-P15 | Backlight |
| P16 | Clock |
| P17-P18 | Sync H/V |

The integral connector (8), along with either socket (11) or (12), provide a means of reversible cooperation between the display device (4) and the cover member (3). Namely, the display device (4) is integrated as a component within the personal computer, while in either a first or second configuration. While in the first configuration, the personal computer (1) is available for operation in an open configuration. While in the second configuration, the personal computer (1) is available for operation in a closed configuration. Inasmuch as each configuration offers unique advantages, the reversible display feature provides the flexibility to choose between the first or open housing configuration or the second or closed housing configuration. One skilled in the art will recognize, that the reversible cooperation may be served by either providing a set of contacts on each side of the integral connector (8), or by otherwise positioning the sockets (11) or (12) to accept the display device in both a first and second configuration.

The display device (4) may be a plasma display device, a liquid crystal display of other flat display device. In the preferred embodiment of the invention, the display device is of a multi-function or multi-purpose type. Namely, a display device providing a touch screen feature or function in addition to the standard display function.

The preferred embodiment of the invention further provides for cooperative operation of the display device (4) as a display means and the keyboard (5) providing a means of data input, with the computer in a first, or open housing, configuration as illustrated in FIG. 1. The preferred embodiment further provides for operation of the display device (4) as a display means and touch screen as an input means, with the computer in a second, or closed housing, configuration as illustrated in FIG. 2. While in the second or closed housing configuration, the keyboard (5) is not accessible and non-functional. An alternative embodiment is structured so that the touch screen is operable while the housing is in either its closed or open configuration.

FIGS. 1 and 2 further illustrate a releasable latch means on either side of the the display panel (4) to latch the display panel (4) within the cover member (3). The latch means comprises tongue portions (13) extending outwardly from display panel (4) and having a bend designed to provide a slight biasing force urging outward from the display panel (4) and into the cover member (3) when the display panel is fully inserted into the cover member (3). Those skilled in the art will recognize, that alternate latching means may include a ball detent device, mutually engaging elements on the display panel (4) and the cover member (3), or the like.

While the invention has been described above in connection with a preferred embodiment therefor as illustrated by the drawings, those of skill in the art will readily recognize alternative embodiments of the invention can be easily produced which do not depart from the spirit and scope of the invention as defined in the following claims.

What is claimed is:

1. A computer comprising:
   a housing including a base member and a cover member;
   a keyboard disposed within said base member, and
   a removable display device including an electrical connector means disposed asymmetrically on said removable display device, said removable display device being disposed within said cover member having a first and second socket means for receiving said connector means, said removable display device being reversible between a first configuration and a second configuration within said cover member, while in said first configuration said connector means being electrically connected to said first socket means and while in said second configuration said connector means being electrically connected to said second socket means.

2. The computer of claim 1, further comprising:
means for latching said removable display device within said cover member.

3. The computer of claim 1 wherein:
said removable display device includes a touch screen for inputting data.

4. The computer of claim 3 wherein:
said removable display device operates as a display means while in said first configuration, and
said removable display device operates as a display mans and as an input means while in said second configuration.

5. The computer of claim 3 wherein:
said removable display device operates as a display means and as an input means while said removable display device is disposed within said cover member in said first configuration and in said second configuration.

6. A method of using a portable computer, said portable computer comprising a housing including a base member and a cover member, a keyboard disposed within said base member and a removable display device including an electrical connector means disposed asymmetrically on said removable display device, said removable display device disposed within said cover member having a first and second socket means, while in said first configuration said connector means is electrically connected to said first socket means and while in said second configuration said connector means is electrically connected to said second socket means, said method including the steps of:
configuration said portable computer by disposing said removable display device in said cover member in said first configuration, and while in said first configuration inputting data with said keyboard and displaying output on said removable display device, and selectively reconfiguring said computer by disposing said removable display device in said cover member in said second configuration, and while in said second configuration inputting data with said removable display device and displaying output on said removable display device.

7. A portable computer comprising:
a plurality of housing members, wherein said housing members pivotally cooperate about a hinge means;
a keyboard disposed within a first of said housing members, and
a removable display device including a n electrical connector means disposed asymmetrically on said removable display device, said removable display device disposed within a second of said housing members having first and second socket means for receiving said connector means, wherein said removable display functions as a display while disposed in a first configuration and wherein said removable display function as a combined display and touch screen input means while disposed in a second configuration, while in said first configuration said connector means being electrically connected to said first socket means and while in said second configuration said connector means being electrically connected to said second socket means.

* * * * *